No. 689,480. Patented Dec. 24, 1901.
B. F. FOWLER.
LUBRICATING DEVICE.
(Application filed Apr. 6, 1901.)
(No Model.)
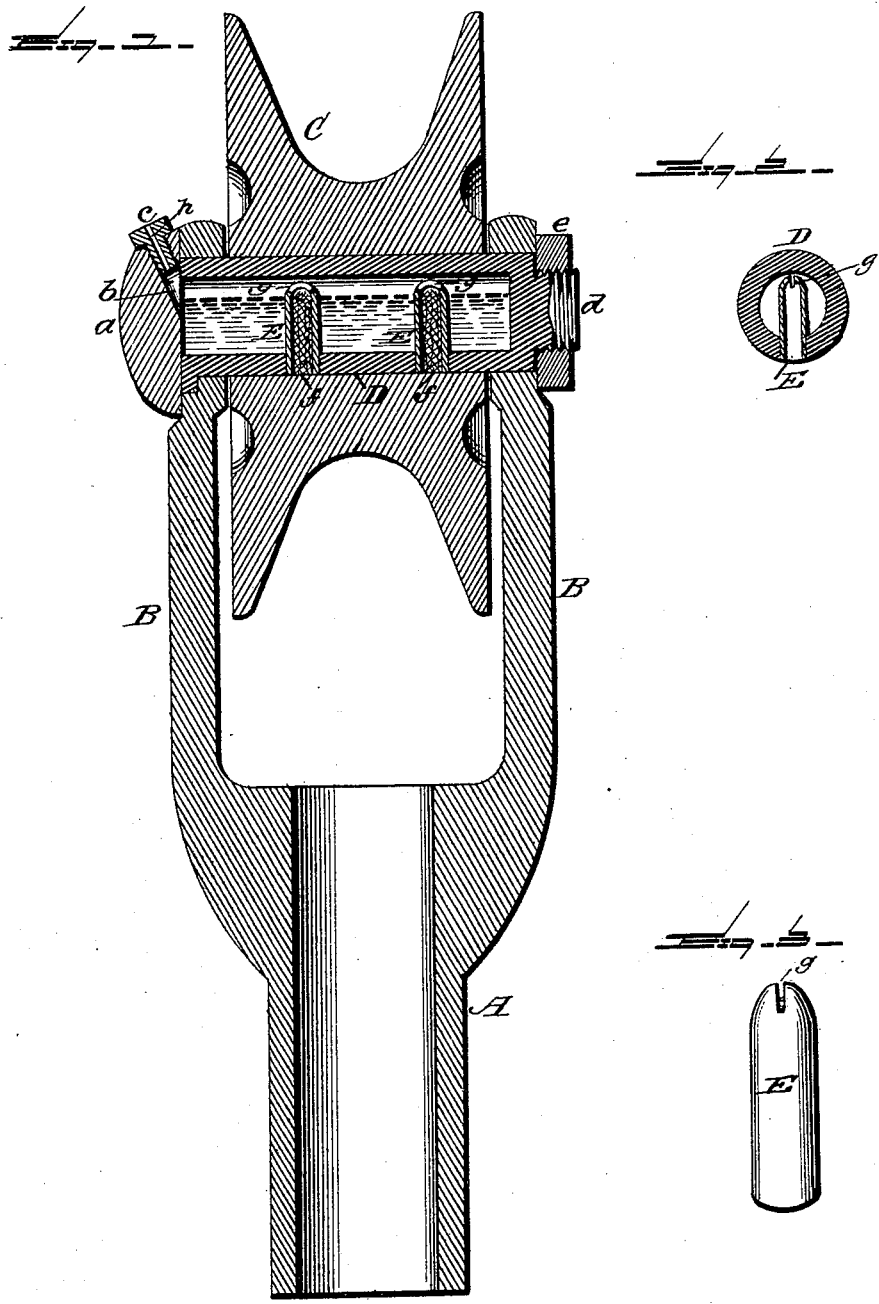
WITNESSES:
INVENTOR
Benjamin F. Fowler.
BY Chas. H. Fowler
Attorney.

UNITED STATES PATENT OFFICE.

BENJAMIN F. FOWLER, OF MINNEAPOLIS, MINNESOTA.

LUBRICATING DEVICE.

SPECIFICATION forming part of Letters Patent No. 689,480, dated December 24, 1901.

Application filed April 6, 1901. Serial No. 54,653. (No model.)

*To all whom it may concern:*

Be it known that I, BENJAMIN F. FOWLER, a citizen of the United States, residing at Minneapolis, in the county of Hennepin and State of Minnesota, have invented certain new and useful Improvements in Lubricating Devices; and I do hereby declare that the following is a full, clear, and exact description of the same, reference being had to the annexed drawings, making a part of this specification, and to the letters of reference marked thereon.

The present invention has for its object to provide a self oiling or lubricating pin or spindle or stationary axle, over which a pulley or wheel revolves, and relates more particularly to that class in which the pin, spindle, or axle is formed hollow for containing the lubricant and a number of perforated tubes extending transversely through the hollow pin, spindle, or axle and containing cotton wicking for taking up the lubricant and supplying it thereto.

It is the purpose of the invention to materially improve the above class of lubricating devices, whereby greater strength, durability, and effectiveness in the supply of the lubricant to the bearing is obtained; and it consists in a lubricating device constructed substantially as shown in the drawings and hereinafter described and claimed.

Figure 1 of the drawings is a sectional elevation of a trolley, showing my improved lubricating device applied thereto; Fig. 2, a cross-section through the hollow bearing, showing the tube without the wicking; Fig. 3, a detail view, on an enlarged scale, of one of the tubes.

In the accompanying drawings I have shown my invention applied to a trolley device; but it may be used in connection with any stationary hollow bearing for supporting a rotatable pulley, wheel, or other like object where the same requires lubricating.

The trolley device herein shown comprises the usual trolley-pole A, with upwardly-extending arms B for connecting thereto the trolley-wheel C through the medium of the hollow bearing D, said bearing at one end having a head $a$, with inclined hole $b$, through which the oil or other lubricant is supplied to the hollow bearing, a screw $c$ closing the hole when not in use. The head $a$ may be cast or otherwise formed with the hollow bearing D, or the head may be made separate and afterward secured thereto in any suitable manner. I have shown in the drawings the head formed independent of the hollow bearing, and it may be secured thereto by brazing or welding or may be riveted thereto, as found preferable, the manner of providing the hollow bearing with the head being immaterial. The opposite end of the hollow bearing D terminates in a screw-nipple $d$ to receive a jam-nut $e$ for securing the bearing to the arms B, so that it will not turn, but remain stationary while the trolley-wheel revolves. Any suitable means may be employed for securing the bearing to its support, depending entirely upon the use to which the self-lubricating bearing is applied. The hollow bearing D has a plurality of holes on one side only to receive the tubes E, which extend diametrically through the bearing to nearly the inner wall thereof and contain a wicking $f$, of cotton or other suitable material, which takes up the oil or other lubricant and supplies it to the bearing. The inner end of the tube E, which extends into the hollow bearing, is closed with the exception of a slit $g$, thereby preventing the too-rapid supply of the lubricant to the wick. There are no perforations in the tube E through the sides thereof, the only openings being through the ends, and the tube does not extend through both the walls of the hollow bearing D; but the end with the slit remains wholly within the bearing, the flow of lubricant being entirely controlled by the motion of the pulley or wheel C, and when the latter stops the supply of lubricant to the wick stops also. The screw $c$ may be provided with a vent-hole $h$ and when not required may be closed by the introduction of felt or other temporary filling in the hole to close it against the admittance of dust.

The open end of the tube E, which extends through the wall of the tubular bearing D, is upon the lower or under side of the bearing and directly opposite the frictional contact of the pulley or wheel C, thereby removing the danger of the open end of the tube clogging by filling with any foreign matter, such as dust or dirt, settling upon the upper side of the bearing.

Any suitable opening may be substituted for the slit $f$ such as will allow the lubricant to be drawn into the tube and wick during the rotation of the pulley or wheel, the essential feature of the invention residing in extending the tube through one side wall only of the hollow bearing, so that the lubricant will be supplied to the under side instead of extending the tube diametrically through both the walls of the bearing and supplying the lubricant from both sides thereof.

Having now fully described my invention, what I claim as new, and desire to secure by Letters Patent, is—

1. A lubricating device comprising a hollow bearing for containing the lubricant and one or more lubricant-supply tubes extending diametrically through the lower side wall only of the bearing whereby the lubricant is supplied to the under side only of the bearing, said tube or tubes having openings at its ends, and a suitable wheel mounted upon the hollow bearing, substantially as and for the purpose set forth.

2. A lubricating device comprising a hollow bearing having an opening or hole for supplying the lubricant thereto, means for closing said opening or hole, lubricant-supplying tubes having openings at both their ends and extending diametrically and part way through the bearing from the under side thereof, and a suitable wheel mounted upon the hollow bearing, substantially as and for the purpose described.

3. A lubricating device comprising a hollow bearing having an opening for supplying the bearing with lubricant, means for closing the opening and a suitable vent for the bearing, and lubricant-supplying tube or tubes extending through the bottom or under side of the bearing and part way only into the same, said tubes having openings at their ends, substantially as and for the purpose specified.

In testimony that I claim the above I have hereunto subscribed my name in the presence of two witnesses.

BENJAMIN F. FOWLER.

Witnesses:
A. C. MIDDELSTADT,
W. S. CILLEY.